(12) United States Patent
DeHaan et al.

(10) Patent No.: US 8,255,409 B2
(45) Date of Patent: Aug. 28, 2012

(54) SYSTEMS AND METHODS FOR GENERATING A CHANGE LOG FOR FILES IN A MANAGED NETWORK

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 281 days.

(21) Appl. No.: 12/395,601

(22) Filed: Feb. 27, 2009

(65) Prior Publication Data
US 2010/0223274 A1    Sep. 2, 2010

(51) Int. Cl.
*G06F 17/30* (2006.01)
(52) U.S. Cl. ........................................................ 707/758
(58) Field of Classification Search .................. None
See application file for complete search history.

(56) References Cited

U.S. PATENT DOCUMENTS

| | | | |
|---|---|---|---|
| 2005/0086384 A1* | 4/2005 | Ernst | 709/248 |
| 2006/0004806 A1* | 1/2006 | Kraft | 707/101 |
| 2006/0031188 A1* | 2/2006 | Lara et al. | 707/1 |
| 2006/0075294 A1* | 4/2006 | Ma et al. | 714/13 |
| 2007/0005661 A1* | 1/2007 | Yang | 707/200 |
| 2007/0027936 A1* | 2/2007 | Stakutis et al. | 707/204 |
| 2007/0288530 A1* | 12/2007 | Romem et al. | 707/202 |
| 2010/0198964 A1* | 8/2010 | Tanaka | 709/224 |

* cited by examiner

*Primary Examiner* — Yuk Ting Choi
(74) *Attorney, Agent, or Firm* — Lowenstein Sandler PC

(57) ABSTRACT

Embodiments relate to systems and methods for generating a change log for files in managed network. A set of managed machines, such as personal computers or servers, can be managed by a network management platform communicating with the machines via a secure channel. The network management platform can employ a package management tool to manage files stored or hosted in the managed network. The network management platform can further employ a change monitor or other logic to locate additional files located in the managed network but that may not be under the control of or registered to the package management tool. A systems administrator or other user can invoke both the package management tool and the change monitor logic to initiate a discovery process and locate all available files associated with the network, and generate a unified change log recording all available files and/or their changes.

20 Claims, 4 Drawing Sheets

SYSTEMS AND METHODS FOR GENERATING A CHANGE LOG FOR FILES IN A MANAGED NETWORK

FIELD

The present teachings relate to systems and methods for generating a change log for files in a managed network, and more particularly to platforms and techniques for discovering both files managed by a package management tool and files outside the control of the package management tool, and generating a unified change log or other record of that file activity in the network.

BACKGROUND OF RELATED ART

Network management platforms exist which permit a systems administrator to connect to a set of targets in a network, and perform maintenance and diagnostic activities on that group of managed machines. The network management platform can identify individual targets via a public key or other security credential, and identify the software provisioning requirements, obtain a hardware inventory, or perform other management tasks on validated machines. In general, existing network management platforms can be hosted on a central server or other facility that permits connection to, identification, and management of the set of targets and associated files and data.

In terms of the maintenance of machines populated on a network as well as the maintenance of the network on a comprehensive basis, systems administrators from time to time may need to take stock of individual machines and their associated data. Package management tools exist which permit an administrator or other user to examine a set of files which have been registered with that tool, and track that collection of data to identify updates and other changes. Existing package management tools are, however, not guaranteed to locate or be compatible with all types of data, storage media, or other parameters of a given network. A systems administrator or other user wishing to generate a comprehensive view or record of network file activity, including to create a record of files changes, may not be able to identify all desired files. Thus, there is a need in the art for methods and systems that provide comprehensive management of file management activity, regardless of whether those files are actively controlled by a package management tool.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating a change log for files in a managed network. More particularly, embodiments relate to platforms and techniques for the identification and recording of file change activity for files in a managed network. According to embodiments in one regard, a network management platform can access, invoke, or employ a package management tool to identify data files associated with or stored in the network determine changes in files under the management or control of that tool. According to embodiments, the network management platform can likewise access, invoke, or employ a change monitor engine or other logic to probe the managed network for additional or different files which may not be registered with or under the control of the package management tool. The change monitor can generate results via a discovery process which interrogates hosts, targets, data storage, and/or other nodes or resources of the managed network to locate files and track the changes or updates to those files. The network management engine can then combine the records for both the first set of files identified by the package management tool and the second set of files identified by the change monitor engine or logic, to generate a combined or unified change log for all available files on the managed network. In embodiments, the record of the file versions or changes can be stored, and in embodiments, the files themselves can be stored in a backup storage system, or other location. A systems administrator, the user themselves, or others can thereby discover, track, and manage the entire collection of available files in the network associated.

Reference will now be made in detail to exemplary embodiments of the present teachings, which are illustrated in the accompanying drawings. Where possible the same reference numbers will be used throughout the drawings to refer to the same or like parts.

Figure 1:
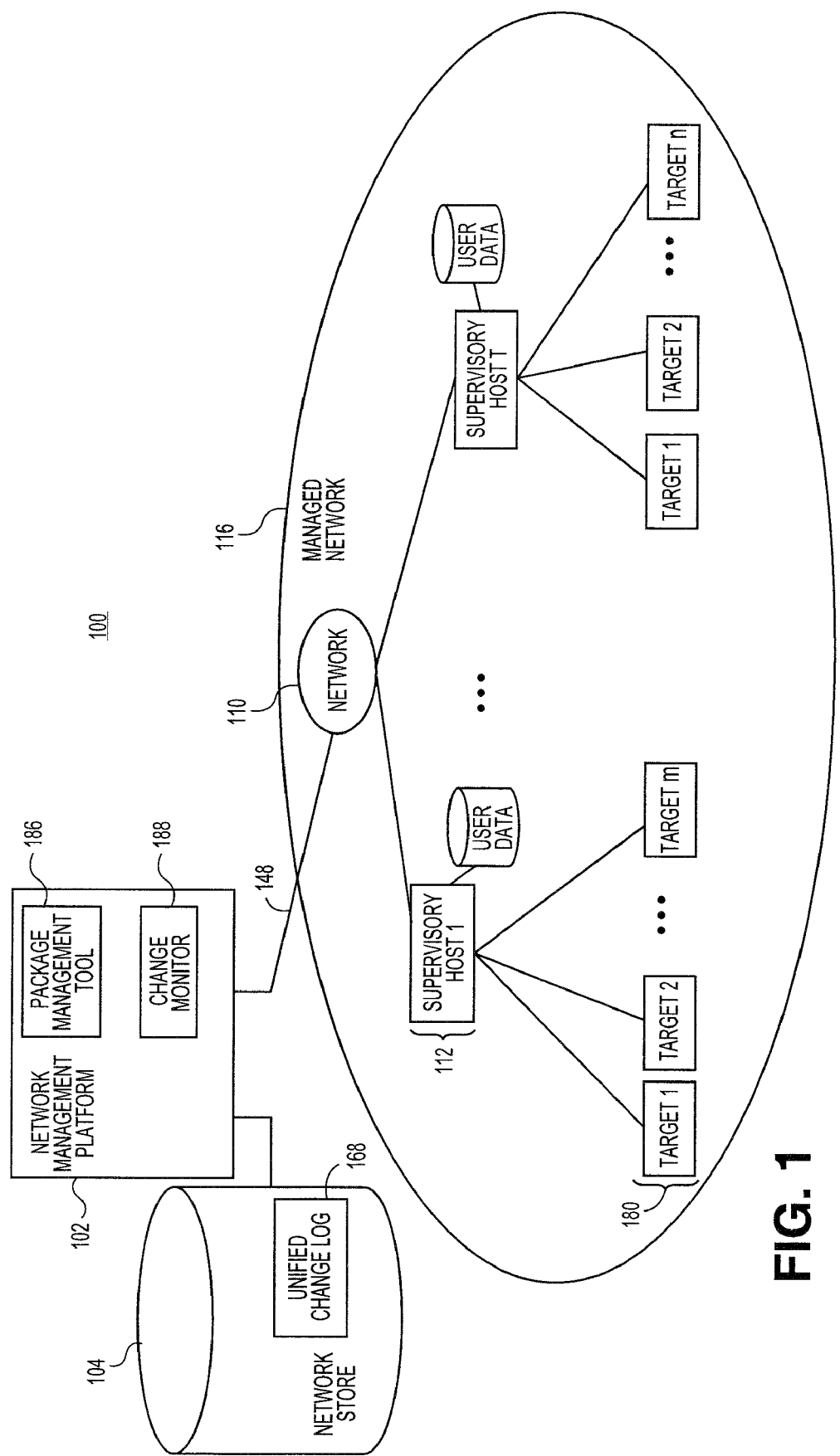
FIG. 1 illustrates an overall network in which systems and methods for generating a change log for files in a managed network can be practiced, according to various embodiments of the present teachings.

FIG. 1 illustrates an overall system 100 in which systems and methods for generating a change log for files in a managed network can be implemented, according to various embodiments of the present teachings. In embodiments as shown, network management platform 102 can communicate with managed network 116 via a secure channel 148. Secure channel 148 can for instance be or include the secure channel and related resources described in co-pending U.S. application Ser. No. 12/130,424, filed May 30, 2008, entitled "Systems and Methods for Remote Management of Networked Systems Using Secure Modular Platform," which published as U.S. Patent Application Publication No. 2009/0300180, assigned or under obligation of assignment to the same entity as this application, and which application is incorporated by reference herein. Secure channel 148 can be or include, for example, a secure socket layer (SSL) connection, a channel established using a public/private key infrastructure, and/or other connections, channels, or protocols. Managed network 116 can include, as shown, a set of supervisory hosts 112, a set of targets 180, and/or other machines, devices, clients, and/or other hardware, software, storage or other resources.

While secure channel 148 is illustratively shown as one channel to managed network 116 or devices therein, it will be understood that in embodiments, secure channel 148 can comprise multiple channels or connections. In embodiments, secure channel 148 can instead be replaced by a non-secure channel or connection. In general, network management platform 102 can communicate with the managed network 116 and its constituent machines and resources, which can for instance comprise personal computers, servers, network-enabled devices, virtual machines, and/or other devices, and manage the security of those machines under the supervision of network management platform 102.

The network management platform 102 can host a set of engines, logic, and/or other resources to interrogate managed network 116 and identify files stored in that network. Network management platform 102 can communicate with associated network store 104 to store network-related management data. In embodiments as shown, network management platform 102 can also host or access a package management tool 186 that acts to register, monitor, and track software applications and/or their related data files being used in managed network 116. According to embodiments as shown, network management platform 102 can likewise host or access a change monitor 188 which is configured to communicate with managed network 116 to locate additional files or other data or information hosted or stored in managed network 116 which may not be registered to or under the control of package management tool 186. According to embodiments in one regard, network management platform 102 can thereby operate to connect to a given one or more of managed network 116 to probe managed network 116 for data files, application files, user profile files, and/or other files, data, or information associated with data objects stored or hosted in managed network 116, and generate a unified change log 168 reflecting all files, file changes, and related data in the network, whether under active management by a package management or other tool, or not.

Figure 2:
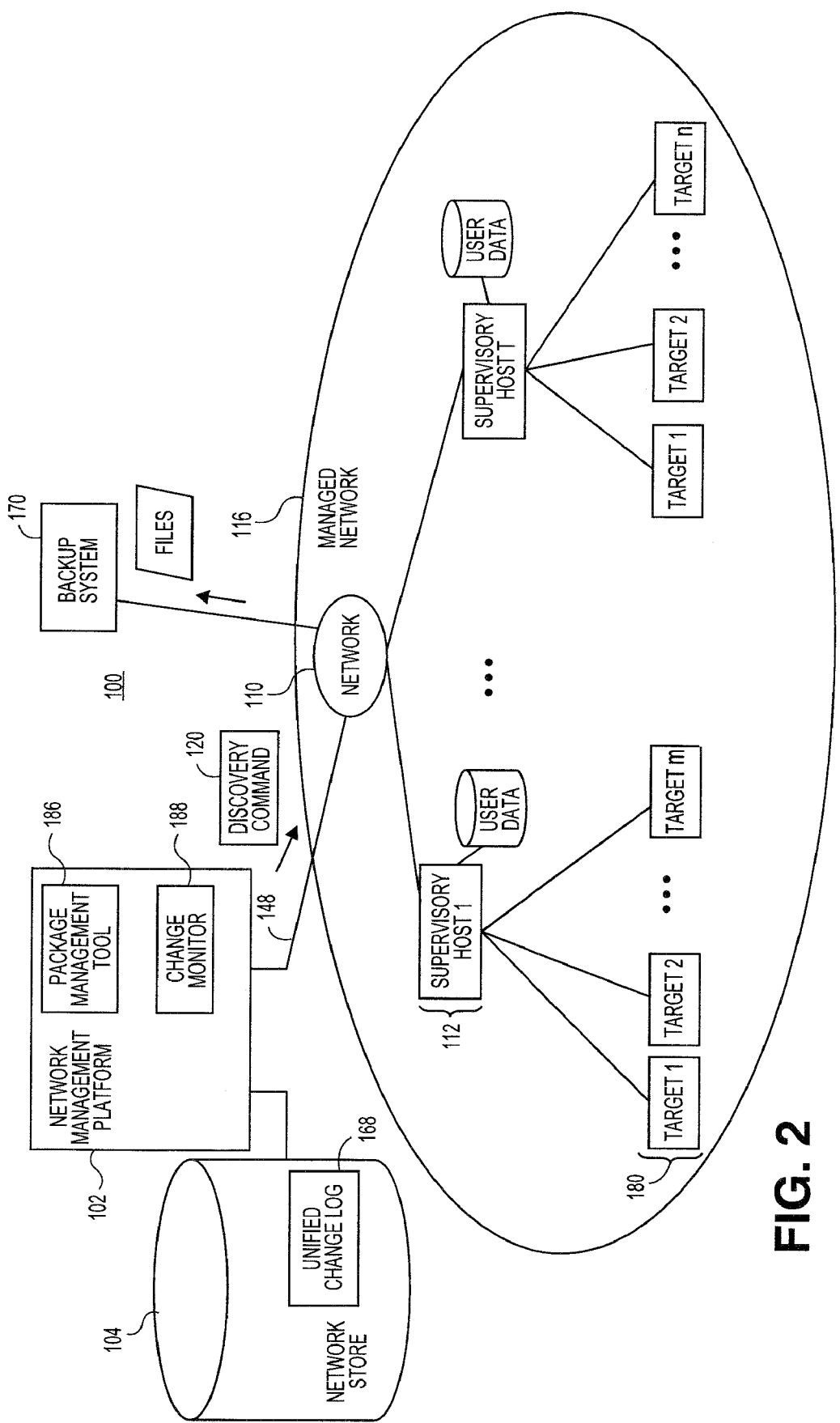
FIG. 2 illustrates an overall network in which systems and methods for generating a change log for files in a managed network can be practiced to various embodiments of the present teachings, including discovery and storage of files.

As for example more particularly shown in FIG. 2, network management platform 102 can host or access a package management tool 186 to identify and manage a set of files generated by one or more applications or services. Network management platform 102 can likewise host or access a change monitor 188 to located file data including, for example, data files, application files, and/or other files or information in managed network 116 that may not be controlled by package management tool 186. Network management platform 102, for instance via change monitor 188, can for example issue one or more discovery command 120 to cause set of targets 180, set of supervisory hosts 112, and/or other nodes in managed network 116 to report the existence, identity, and location of available files hosted or stored on any node of the managed network 116. According to various embodiments, change monitor 188 can receive information identifying files which are discovered including, for instance, a current version, version or change history, users who accessed the file, authorized users or groups authorized to access the file, access dates, edits, file size, file format, other access control lists, or other information. Network management engine 102 can then access and combine the data for the first set of files identified in package management tool 186 and the data for the second set of files identified via change monitor 188 to generate a unified change log 168. Unified change log 168 can, for example, store information related to file activity in table, tree, list, or other format. When a systems administrator or other user wishes to review the file activity on the network including a record of changes for files under control of a package management tool and those not under such control, the unified change log 168 can be examined to locate and access that information in a centralized and comprehensive manner.

According to embodiments, in addition to building a unified change log 168, in embodiments, if desired network management platform 102 can also generate a backup copy of the data files and their changes for a set of files, by accessing or invoking a local or remote backup platform 170. Backup platform 170 can be or include a database or other data store, and can record the files associated with one or more unified change log 168, themselves. In embodiments, backup platform 170 can be configured to periodically request or receive an updated unified change log 168, and generate further backups or incremental backups, as desired.

Figure 3:
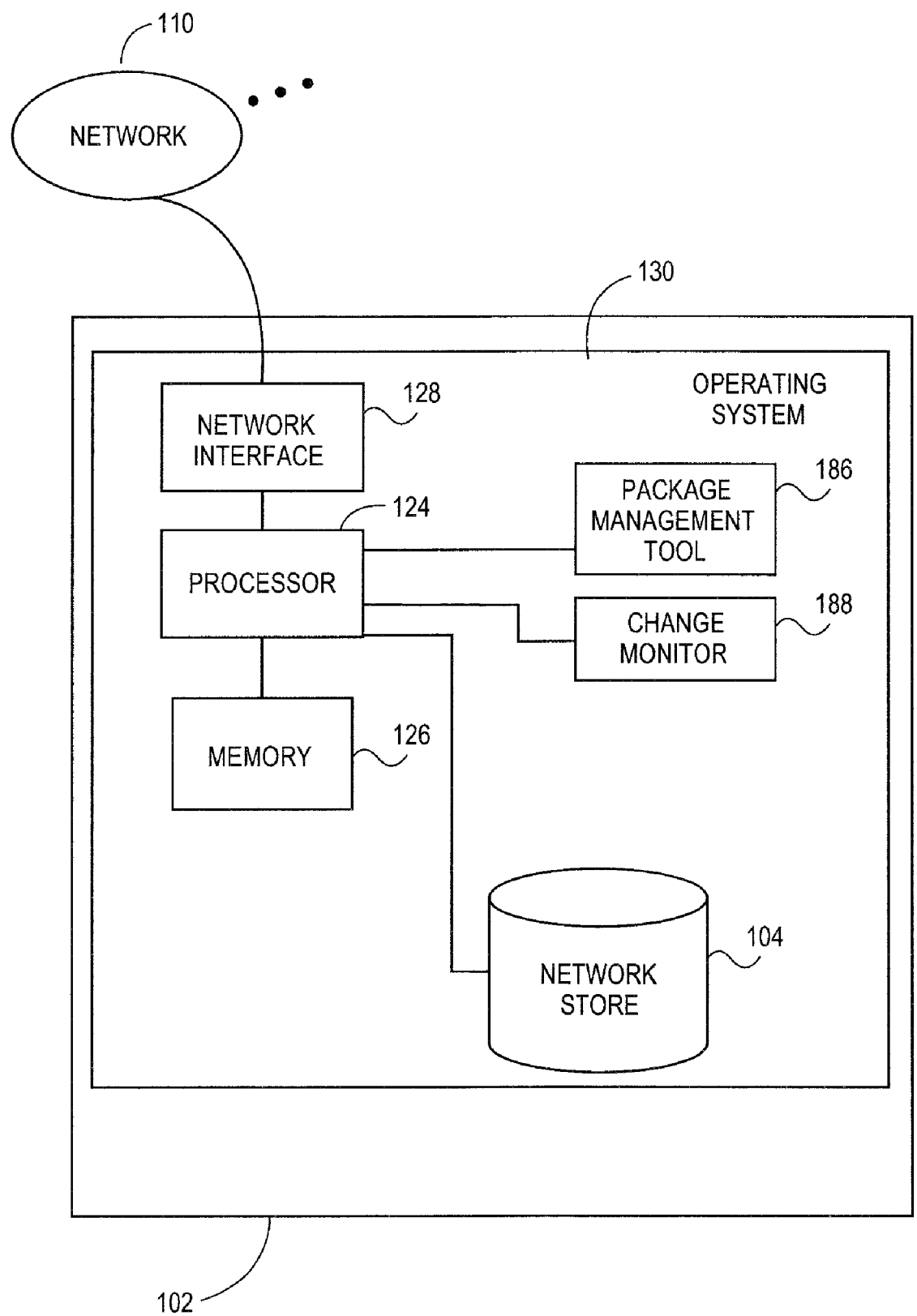
FIG. 3 illustrates an illustrative hardware configuration which can support systems and methods for generating a change log for files in a managed network according to various embodiments of the present teachings.

FIG. 3 illustrates an exemplary diagram of hardware and other resources that can be incorporated in a network management platform 102 configured to communicate with managed network 116 and/or other resources, according to embodiments. In embodiments as shown, the network management platform 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with package management tool 186, change monitor 188, and/or other resources or logic, to execute control logic and perform management and file tracking processes described herein. Other configurations of the network management platform 102, associated network connections, and other hardware and software resources are possible. While FIG. 3 illustrates network management platform 102 as a standalone system comprises a combination of hardware and software, network management platform 102 can also be implemented as a software application or program capable of being executed by a conventional computer platform. Likewise, network management platform 102 can also be implemented as a software module or program module capable of being incorporated in other software applications and programs. In either case, network management platform 102 can be implemented in any type of conventional proprietary or open-source computer language.

Figure 4:
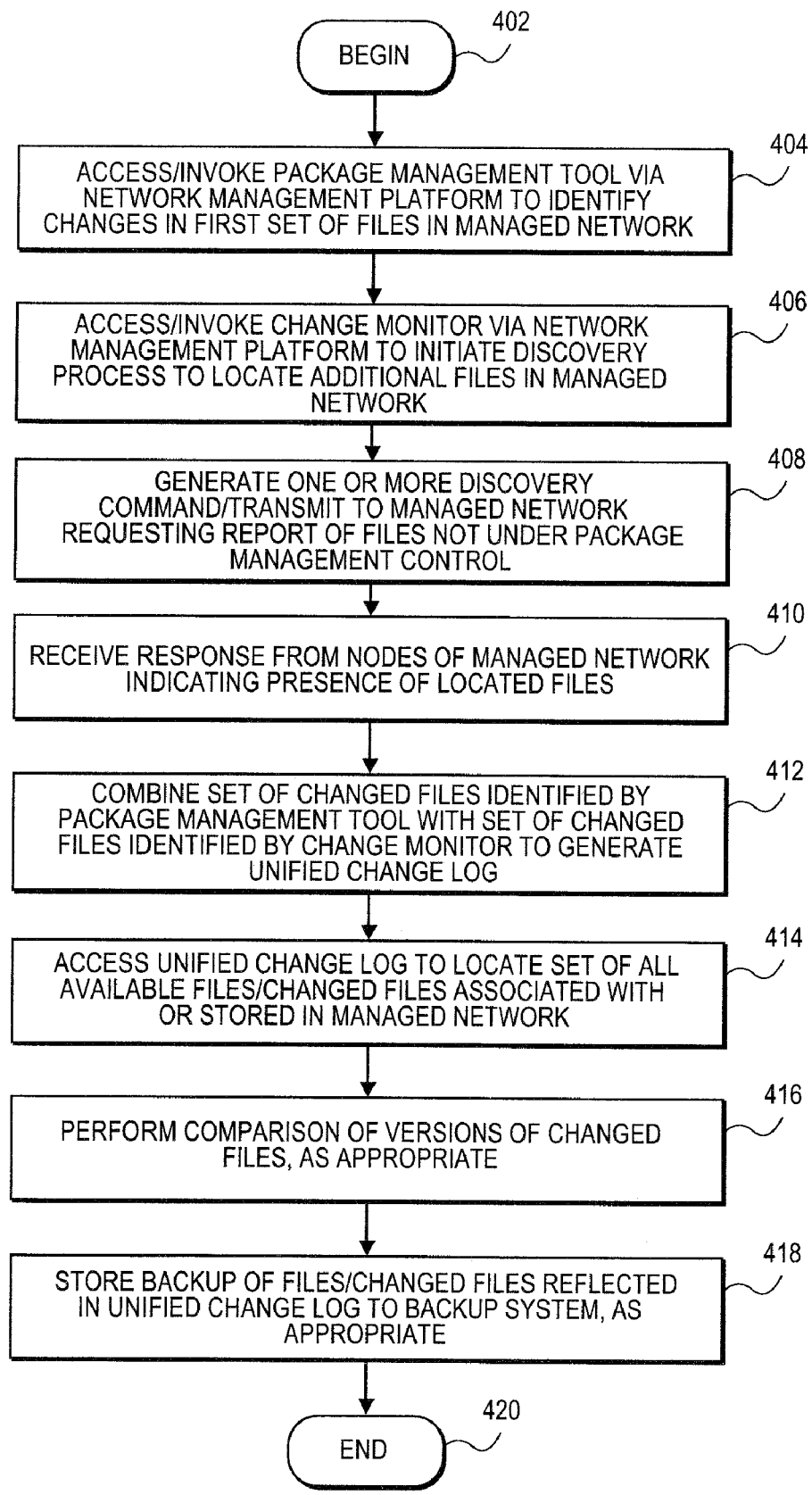
FIG. 4 illustrates a flowchart for processing to generate a change log for network files, according to various embodiments of the present teachings.

FIG. 4 illustrates a flowchart of processing to manage software dependency and network restoration, according to various embodiments. In 402, processing can begin. In 404, a package management tool 186 can be invoked or accessed by or via network management platform 102 to identify changes in a first set of files in a managed network 116 registered to or controlled by package management tool 186. In 406, a change monitor 188 or other engine or logic can be invoked by or via network management platform 102 to initiate a discovery process to discover files located in managed network 116, but which are not controlled by or otherwise associated with package management tool 186. In 408, network management platform 102 via change monitor 188 and/or other logic can generate one or more discovery command 120 and transmit that command to managed network 116 to request a report of files associated with or stored in managed network 116. In 410, network management platform 102 can receive a response from hosts, targets, and/or other nodes of managed network 116 indicating the presence of discovered files, along with any associated metadata such as record or indication of the version, author, change history, or other attributes of those files. In 412, the data related to the set of changed files identified by package management tool 186 can be combined with the data related to the set of changed file identified via change monitor 188 to generate unified change log 168.

In 414, network management platform 102 can access unified change log 168 to locate the set of all available files along with any metadata for those files in a managed network 116. In 416, network management platform 102 can perform an analysis of the versions of two or more files in unified change log 168, for example to identify a most recent version of one or more files, to merge versions of files or different files, or perform other actions. In 418, the files identified in unified change log 168 can be stored to backup system 170, such as a local or remote server or database, as appropriate. In 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single network management platform 102 manages and maintains managed network 116, in embodiments, multiple engines, servers, or other entities can cooperate to perform network management functions. Other resources described as singular or integrated in some embodiments can in embodiments be plural or distributed, and resources described as embodiments as multiple or distributed can in embodiments be combined. The scope of the present teachings is accordingly intended to be limited only by the following claims.

What is claimed is:

1. A method, comprising:
identifying, by a package management tool executable by a processor, a set of changed files in a first set of files under control of the package management tool in a managed network;
transmitting a set of discovery commands to a set of nodes of the managed network to detect a second set of files in the managed network, wherein the second set of files is not associated with the package management tool;
identifying a set of changed files in the second set of files, which are not associated with the package management tool; and
combining metadata representing the set of changed files in the first set of files and metadata representing the set of changed files in the second set of files to generate a unified change log, wherein the unified change log provides access to the first set of files and the second set of files.

2. The method of claim 1, further comprising storing the unified change log.

3. The method of claim 1, further comprising storing the first set of files and the second set of files to a backup system.

4. The method of claim 1, further comprising accessing the first set of files and the second set of files to analyze file system activity.

5. The method of claim 1, further comprising transferring at least a portion of the second set of files to the first set of files.

6. The method of claim 1, wherein a change to the set of changed files in the first set of files or the set of changed files in the second set of files comprises at least one of a change in file content, a change in date associated with the file, a change in file size, a change in file version, a change in file extension, a change in file ownership, a change in access time, a change in group rights, a change in other access permissions, a change in other metadata, or a change in other attributes.

7. The method of claim 1, further comprising comparing versions of the first set of files and the second set of files to identify a most recent version of matching files.

8. A system, comprising:
a memory comprising instructions;
an interface to a managed network; and
a processor, connected to the memory and the interface to the managed network, the processor configured to execute the instructions to:
identify, by a package management tool executable by the processor, a set of changed files in a first set of files under control of the package management tool in the managed network,
transmit a set of discovery commands to a set of nodes of the managed network to detect a second set of files in the managed network, wherein the second set of files is not associated with the package management tool,
identify a set of changed files in the second set of files, which are not associated with the package management tool, and
combine metadata representing the set of changed files in the first set of files and metadata representing the set of changed files in the second set of files to generate a unified change log, wherein the unified change log provides access to the first set of files and the second set of files.

9. The system of claim 8, wherein the processor is further configured to store the unified change log.

10. The system of claim 8, wherein the processor is further configured to store the first set of files and the second set of files to a backup system.

11. The system of claim 8, wherein the processor is further configured to access the first set of files and the second set of files to analyze file system activity.

12. The system of claim 8, wherein the processor is further configured to transfer at least a portion of the second set of files to the first set of files.

13. The system of claim 8, wherein a change to the set of changed files in the first set of files or the set of changed files in the second set of files comprises at least one of a change in file content, a change in date associated with the file, a change in file size, a change in file version, a change in file extension, a change in file ownership, a change in access time, a change in group rights, a change in other access permissions, a change in other metadata, and a change in other attributes.

14. The system of claim 8, wherein the processor is further configured to compare versions of the first set of files and the second set of files to identify a most recent version of matching files.

15. A non-transitory computer-readable medium having a set of instructions stored therein, which when executed cause a machine to perform a method comprising:
identifying, by a package management tool of a network management device, a set of changed files in a first set of files under control of the package management tool in a managed network;
transmitting, by a change monitor of a network management device, a set of discovery commands to a set of nodes of the managed network to detect a second set of files in the managed network, wherein the second set of files is not associated with the package management tool;
identifying, by the change monitor of the network management device, a set of changed files in the second set of files, which are not associated with the package management tool; and
combining, by the network management device, metadata representing the set of changed files in the first set of files and metadata representing the set of changed files in the second set of files to generate a unified change log, wherein the unified change log provides access to the first set of files and the second set of files.

16. The non-transitory computer-readable medium of claim 15, wherein the method further comprises storing the unified change log.

17. The non-transitory computer-readable medium of claim 15, wherein the method further comprises storing the first set of files and the second set of files to a backup system.

18. The non-transitory computer-readable medium of claim 15, wherein the method further comprises accessing, by the network management device, the first set of files and the second set of files to analyze file system activity.

19. The non-transitory computer-readable medium of claim 15, wherein the method further comprises transferring, by the network management device, at least a portion of the second set of files to the first set of files.

20. The non-transitory computer-readable medium of claim 15, wherein a change to the set of changed files in the first set of files or the set of changed files in the second set of files comprises at least one of a change in file content, a change in date associated with the file, a change in file size, a change in file version, a change in file extension, a change in file ownership, a change in access time, a change in group rights, a change in other access permissions, a change in other metadata, or a change in other attributes.

* * * * *